March 2, 1943. H. W. SANFORD 2,312,361
WHEEL
Filed Feb. 15, 1940
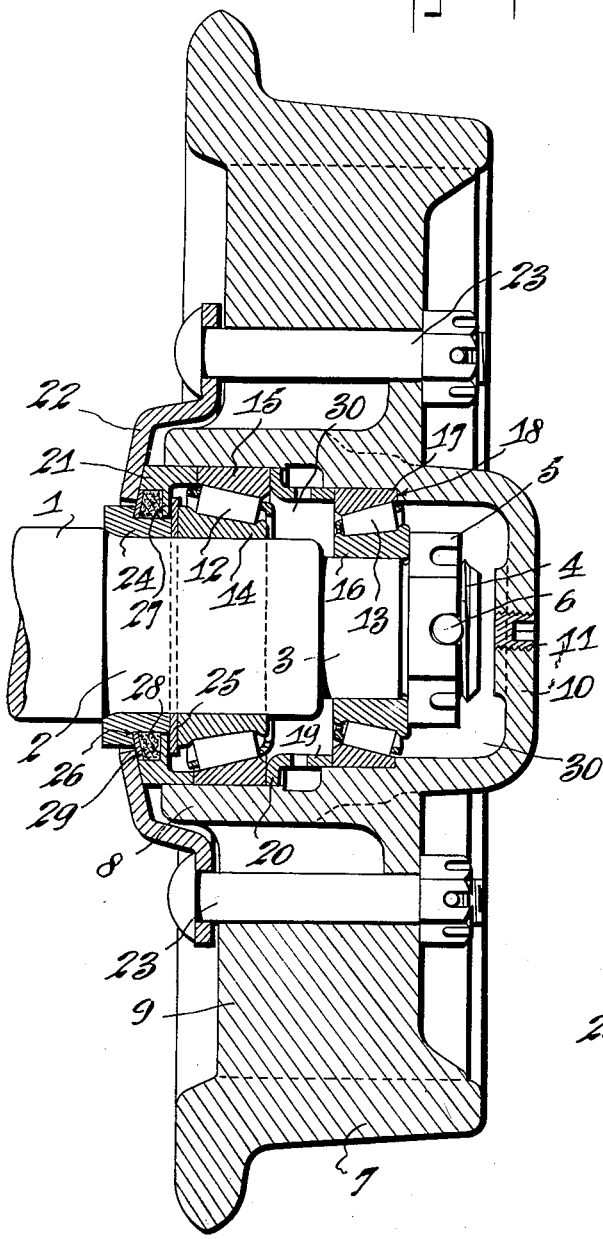
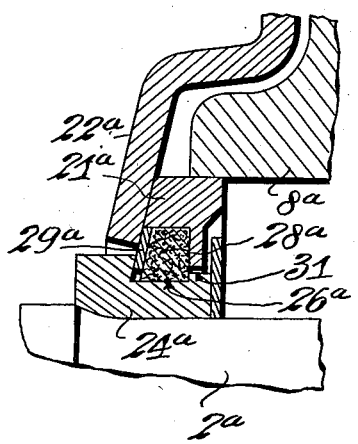
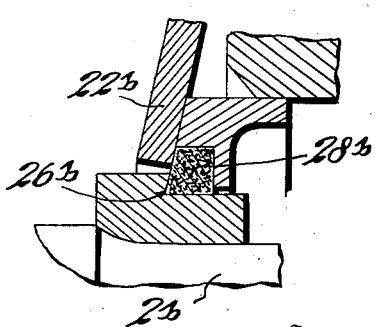
Inventor
Hugh W. Sanford
By Cyrus Kehr & Swecker
his Attorneys Patented Mar. 2, 1943

2,312,361

UNITED STATES PATENT OFFICE 2,312,361

WHEEL

Hugh W. Sanford, Knoxville, Tenn., assignor to The Sanford Investment Company, Wilmington, Del., a corporation of Delaware Application February 15, 1940, Serial No. 319,121

9 Claims. (Cl. 308—211)

This invention relates to an improvement in wheels, and more particularly to wheels having anti-friction bearing assemblies, such as tapered roller bearings and designed for use on mine cars and the like.

The tapered roller bearings used heretofore in car wheels have had a tendency to lock from the wedging of the rollers up the incline of the races when end thrusts are applied thereto, particularly when the car is traveling around a curve. To accommodate for this locking action, it has been regarded as important to secure the outermost races tightly to the wheel hub and to let what slippage occurs take place between the innermost races and the axle journal. Usually, both of the innermost races are loose on the axle because the nut on the end of the axle cannot be pulled up tightly enough to eliminate all end play, and if it should be drawn up too tight, it would cause heating of the bearings very quickly. Therefore, some play is always allowed in the bearing assembly.

In the operation of mine car wheels, the heavy thrust loads are carried by the inner bearing, and since the outer bearing receives end thrusts that are less severe than the inner bearing, it is unnecessary to provide the same size bearings at the inner and outer sides of the wheel. In flanged wheels running on tracks, the end thrust forcing the wheels inwardly on the axles when traveling around curves, is very severe. This in many cases is the most severe pressure that the bearings have to take care of, and, since the outer bearing has only a small relative end thrust, the use of the smaller bearings on the outside is economical and provides quite a saving in the cost of the set-up.

The object of this invention is to simplify and improve the construction of the anti-friction bearing assemblies while reducing the cost of the construction, by providing for a reduction in size of the outer wheel bearing relative to the inner bearing while locking the outermost races of both bearings tightly to the wheel hub, allowing any slip that occurs to take place between the innermost races and the axle. This also provides for the removal of the wheel hub from the bearing assembly while the latter is retained as a unit locked on the axle.

A further object of the invention is to improve the sealing means between the inner end of the hub and the axle to prevent the escape of grease from within the hub and to confine the lubricant in a chamber in the hub to prevent all of it from leaking out, even if the sealing means should wear out.

In carrying out these objects, the invention is embodied in a preferred form thereof, which is illustrated, together with modifications thereof, in the accompanying drawing, in which:

Fig. 1 is a vertical sectional view through a car wheel illustrating this invention applied thereto, parts being in elevation;

Fig. 2 is a detail sectional view therethrough showing a modified form of seal between the wheel hub and axle; and Fig. 3 is a similar view showing still another modified form of seal.

Referring to Fig. 1, an axle is designated generally by the numeral 1 provided with an axle journal 2, terminating at its outer end in a reduced journal portion 3. The extreme end of the reduced portion 3 is externally screw-threaded at 4 to receive thereon a nut 5 adapted to be adjusted and locked in place by a cotter pin 6.

Surrounding the axle 1 is a wheel which is illustrated as a car wheel provided with a tread 7 and hub 8 connected together integrally by a web or spokes 9. The inner end of the hub 8 is initially open, but the outer end (toward the outer side of the wheel) is closed by an integral end wall 10, which is provided with an orifice in which a plug 11 is fitted and through which lubricant may be introduced into the hub of the wheel for lubricating the bearings therein.

The hub 8 surrounds the journal portions 2 and 3 of the axle and is journaled thereon by two sets of anti-friction bearings 12 and 13, which are shown as tapered roller bearings, and these are spaced apart axially of the hub toward the inner and outer sides of the wheel. However, one-way end thrust ball bearings may be used instead of tapered roller bearings, if desired.

The set of roller bearings 12 is provided with an axle race 14 and a hub race 15 fitted respectively on the axle journal 2 and within the wheel hub 8. The set of anti-friction bearings 13 is provided with an axle race 16 and a hub race 17 fitted respectively upon the axle journal portion 3 and within the wheel hub 8. Although the axle race 16 is free to float axially of the axle portion 3, it is confined at one side by the nut 5, while the hub race 17 is similarly confined by abutting against a shoulder 18 in the hub 8.

The inner set of anti-friction bearings 12 takes the major part of the end thrust of the wheel when traveling around a curve particularly, and accordingly this inner set of bearings is constructed materially larger than the outer set of bearings 13 which are appreciably reduced in diameter relative thereto. This renders the hub race 17 of the roller bearings 13 smaller in outside diameter than the hub race 15 of the set of roller bearings 12. Accordingly, a spacer 19 is interposed between the hub races 15 and 17, but with an out-turned flange 20 in position to abut against the adjacent edge of the hub race 15, while the opposite end of the spacer 19 is in abutting relation with the edge of the hub race 17, whereby the opposite ends of the spacer 19 are of different external diameters corresponding respectively with the hub races and fitting corresponding portions of the inner bore of the hub 8. Thus the hub races of the bearings are slidably fitted to the inner bore of the hub capable of being drawn up in tight relation against the shoulder 18 and to take up for any play that may occur within the hub.

To accomplish this clamping action and to hold the hub races tightly to the hub, a pressure ring 21 is provided, having one edge thereof fitted in and telescoped with the inner end of the hub 8 in abutting relation with the inner edge of the hub race 15, while the opposite edge of the pressure ring 21 projects from the end of the hub in position to receive thereagainst a retaining cap 22 that surrounds the inner end of the hub. The cap 22 and ring 21 are adapted to be drawn in an outward direction relative to the wheel by retaining bolts 23 which extend through the peripheral portion of the cap 22 and through the web or spokes of the wheel to provide for the application of pressure to the ring 21 sufficiently to apply a clamping action of the hub races 15 and 17 to the wheel hub, the spacer 19 having portions of different diameters, applying this pressure from one to the other.

Provision is made for sealing the inner end of the hub to confine the lubricant therein. For this purpose, an axle collar 24 surrounds the inner end of the axle journal 2, with a washer 25 interposed between the adjacent edges of the axle race 14 and said collar 24. The collar 24 is provided with an undercut shoulder 26 at the periphery thereof arranged in radially overlapping relation with a flange 27 formed on the inner side of the pressure ring 21 forming a labyrinth therebetween. A packing ring 28 preferably of felt or like material, is interposed between the shoulder 26 and the flange 27. The packing ring 28 substantially fills this space and is so compressed therein that it tends to grip the axle collar 24 radially, so that as the felt wears where it rotates on the collar during its turning movement with the wheel, the felt tends to keep in close contact with this collar and the wear will be taken up by the pressure of the felt inwardly and radially. Furthermore, since the felt is compressed at the same time transversely it also tends to exert a mild pressure transversely against the shoulders, which in Fig. 2, are shown on both sides of it. In other words, this felt acts as somewhat of a spring cushion, and until it is worn considerably, the pressure of the felt is exerted three ways—namely, against the collars on either side thereof and radially against the collar or axle inside of it. To reduce the wear on the felt of the packing ring, it may be provided with a fiber or leather friction washer 29 interposed between the inner face of the packing ring 28 and the retaining cap 22 and shoulder 26, respectively.

It will be apparent that a reservoir designated generally by the numeral 30 is formed within the hub 8 of the wheel, which may be packed with lubricant for lubricating the roller bearings, and which chamber is closed at the bottom of the wheel when standing still to a point at least as high as the inner edge of the flange 27 at the bottom, which is above the major portions of the rollers at that point. This will trap a substantial amount of lubricant in the chamber 30 against leaking out of the chamber even when the wheel is standing still. Furthermore, when the wheel is rotating rapidly, the centrifugal force would not tend to eject any of the lubricant except that which fills up the wheel to a level higher than the innermost edge of the flange 27.

Fig. 2 shows a somewhat modified form of seal in which the axle collar 24a surrounding the axle portion 2a is provided with a groove 26a therein receiving the packing ring 28a that is interposed between the axle collar 24a and the pressure ring 21a. This provides for a shoulder 31 between the packing ring 28a and the adjacent bearing, which makes it that much more difficult for lubricant to leak past the packing ring 28a from within the chamber of the wheel, thus somewhat more effectively sealing the inner end of the hub 8a around the axle. In this event, the washer 29a should have a sufficiently large inside diameter to pass over the outer diameter of the shoulder 31, and the space between the inner edge of the washer 29a and the bottom of the groove 26a would soon fill up with heavy grease, which would mix with the dirt from the outside and would solidify to provide an automatic seal at this point which would be preserved.

The friction washer 29 of Fig. 1 may be omitted altogether, if desired, as shown in Fig. 3, where the packing ring 28b bears directly against the adjacent edge of the shoulder 26b and the retaining cap 22b. In other respects, this packing arrangement is the same as that shown in Fig. 1, but it may be provided also with the shoulder 31 of Fig. 2, if desired.

The packing and sealing means provided for the wheel and axle structure, is claimed in a divisional application, Ser. No. 443,153, filed May 15, 1942, on Wheel and axle packings.

It will be apparent from Fig. 1 that an economy of construction is provided by having the outer bearings 13 of smaller size than the inner bearings 12 without sacrificing any of the strength, because the latter take the major portion of the end thrust and are constructed sufficiently rugged for this purpose, while the outer bearings are smaller, saving a substantial part of the cost of the construction. Furthermore, the arrangement requires very little machine work due to its simplicity of construction nor does the machine work in the hub construction setup have to be particularly exact, as inaccuracies in this work will not cause binding of the bearings, but will merely change the track gauge of the wheel somewhat.

It will also be apparent from Fig. 1 that the wheel may be wholly removed from the bearing assembly without disturbing the arrangement of the bearings, merely by the removal of the bolts 23, after which the wheel may be pulled off the bearings while leaving them still locked on the axle. The release of the bolts 23 allows the hub of the wheel to slide off the bearings, but they will be retained in their assembled relation through the clamped connection of the hub races and with the outer axle race bearing against the nut 5, while the axle race 14 is retained in place by the collar 24 and washer 25.

At the same time, the axle races are free to turn if a pinching of the rollers should result due to end thrust when the wheel is turning around a curve, but the hub races are clamped tight to the hub by the engagement thereof with the spacer having a large diameter at its point of contact with the larger diameter race than at its point of contact with the smaller diameter race, thus making it possible to use anti-friction bearings of different sizes while accomplishing the desired results.

I claim:

1. The combination with an axle, of a wheel having a hub, at least two sets of anti-friction bearings between the hub and axle and spaced apart axially thereof, the outer set of anti-friction bearings being of smaller average diameter of rolling parts than the inner set, axle race means for the anti-friction bearings, hub race means for the anti-friction bearings, abutment means on the axle in abutting relation with the axle race means, restraining means at the inner end of the hub and having a portion in position for abutting relation with the hub race means, said hub race means including a spacing portion having different outside diameters where in bearing relation with the adjacent hub race means and coacting respectively with and separating the two sets of anti-friction bearings.

2. The combination with an axle, of a wheel having a hub encircling the axle, at least two sets of tapered roller bearings between the hub and axle and spaced apart toward the inner and outer sides of the wheel, the outer set of roller bearings being of appreciably smaller size than the inner set, spaced axle races for the roller bearings mounted on the axle for freedom of movement toward and from each other, abutment means adjustably and releasably secured to the axle for abutting relation with the outer end of the outer axle race, hub races of respectively larger and smaller diameters for the larger and smaller sets of roller bearings, said hub having internal bore portions of different diameters slidably receiving the respective hub races with a spacer therebetween having the opposite ends thereof of respectively larger and smaller sizes corresponding substantially with the larger and smaller diameters of the hub races at the points of abutment therewith and bearing thereagainst, an abutment within the wheel hub directed toward the inner end thereof in abutting relation with the smaller hub race, concentric restraining means encircling the axle at the inner end of the hub, and means for adjustably pressing said concentric restraining means outwardly against the inner end of the adjacent hub race.

3. In a mine car, the combination with an axle, of a wheel having a hub, at least two sets of anti-friction bearings between said hub and the axle and spaced longitudinally on the axle relative to one another, the outer set of anti-friction bearings being of smaller average diameter of rolling parts than the inner set, axle race means for the anti-friction bearings, separated hub race means for the anti-friction bearings, abutment means at the outer end of the axle in bearing relation against the outer axle race means, adjustable restraining means at the inner end of the hub including a part in rigidly secured relation to the hub and a part in position for limiting the inward movement of the adjacent hub race means relative to the hub, spacing means between and in abutting relation with separated hub race means and said spacing means separating the hub race means, said spacing means being of different outside diameters where in contact with said adjacent hub race means, and an abutment in the hub facing inwardly thereof and limiting the outward movement of the outer hub race means relative to said hub, whereby said mine car may be constructed of minimum overall dimensions with maximum load capacity.

4. In a mine car, the combination with an axle, of a wheel having a hub portion cast solid with wheel spokes, at least two sets of anti-friction bearings between said hub portion and the axle and spaced longitudinally on the axle relative to one another, the outer set of anti-friction bearings being of smaller average diameter of rolling parts than the inner set, axle race means for the anti-friction bearings, separated hub race means for the antifriction bearings substantially in direct contact with the inner surface of said hub portion, abutment means at the end of the axle in bearing relation against the outer axle race means and adjustable lengthwise relative to the axle whereby the outward movement of the outermost position of the outer axle race means relative to the axle may be controlled, adjustable restraining means at the inner end of the hub portion including a part in rigidly secured relation to the hub portion and a part in position for limiting the inward movement of the adjustable hub race means relative to the hub portion, spacing means between and in abutting relation with separated hub race means and separating said hub race means, said spacing means having different outside diameters at the points where the same is in contact with the adjustable hub race means, said hub portion having an abutment therein integral therewith and limiting the outward movement of the outer hub race means relative to the hub portion, whereby said mine car may be constructed of minimum overall dimensions with maximum load capacity.

5. In a wheel and axle structure, the combination with an axle, of a wheel having a hub portion integral with a rim, at least two sets of antifriction bearings between said hub portion and the axle and spaced longitudinally on the axle relative to one another, the outer set of antifriction bearings being of smaller average diameter of rolling parts than the inner set, axle race means for the anti-friction bearings, hub race means for the anti-friction bearings substantially in direct contact with the inner surface of the hub portion, abutment means at the outer end of the axle in bearing relation against the outer portion of the axle race means, and adjustable restraining means secured to the wheel and arranged at the inner end of the hub portion in position to limit the inward movement of the hub race means relative to the hub portion, said hub portion having an abutment in the inner surface thereof facing inwardly and limiting the outward movement of the outer portion of the hub race means relative to the hub portion, the hub race means having tracks for the antifriction bearings, and means separating said tracks in spaced relation.

6. In a wheel and axle structure, a wheel having a hollow hub encircling the axle and having an upright sealing wall at its outer end, two sets of antifriction bearings between the hub and axle, the outer set of anti-friction bearings being of smaller average diameter of rolling parts than the inner set, axle race means having tracks for the anti-friction bearings, hub race means having tracks for the anti-friction bearings, the two tracks of the hub race means being fixedly spaced apart axially by means located between said two tracks and the two tracks of the axle race means being arranged for axial adjustment relative to each other, abutment means adjustably and releasably secured to the axle and in abutting relation with an outer end of the axle race means, concentric restraining means encircling the axle at the inner end of the hub, an abutment within the wheel hub directed toward the inner end of the wheel hub and in abutting relation with the hub race means, and means for adjustably pressing said concentric restraining means outwardly toward the inner end of the hub race means whereby the inward movement of said hub race means relative to the hub is limited, said pressing means being releasably and adjustably secured to the wheel structure and at least a part of said pressing means being located externally of said wheel hub, and said pressing means being operable from the outer side of the wheel structure.

7. The combination with an axle, of a wheel having a hub, at least two sets of anti-friction bearings between said hub and the axle and spaced longitudinally on the axle relative to one another, the outer set of anti-friction bearings being of smaller average diameter of rolling parts than the inner set, axle race means for the anti-friction bearings, separated hub race means for the anti-friction bearings, abutment means at the outer end of the axle in bearing relation against the outer axle race means, adjustable restraining means at the inner end of the hub including a part in rigidly secured relation to the hub and a part in position for limiting the inward movement of the adjacent hub race means relative to the hub, spacing means between and in abutting relation with separated hub race means and said spacing means separating the hub race means, said spacing means being of different outside diameters where in contact with said adjacent hub race means, and an abutment in the hub facing inwardly thereof and limiting the outward movement of the outer hub race means relative to said hub, the adjustable restraining means having the inward movement limiting part extending into the inner end portion of the hub and applying axial pressure upon adjustment thereof against the hub race means and the spacing means thereof pressing the outer hub race means securely against the abutment.

8. In a wheel and axle structure, the combination with an axle, of a wheel structure having a hollow hub encircling the axle and carrying a rim having a peripheral flange, two sets of anti-friction bearings between the hub and axle, the outer set of anti-friction bearings being of smaller average diameter of rolling parts than the inner set, axle race means having tracks for the anti-friction bearings, hub race means having separate tracks for the respective sets of anti-friction bearings, the track of the hub race means for the inner set of bearings being arranged in a plane passing through the outer side of the wheel flange, the two tracks of the hub race means being fixedly spaced apart axially by means located between said two tracks, abutment means secured to the axle and in abutting relation with an outer end of the axle race means, restraining means at the inner end of the hub, an abutment within the wheel hub directed toward the inner end of the wheel hub and in abutting relation with the hub race means, and means for adjustably pressing said restraining means outwardly toward the inner end of the hub race means whereby the inward movement of said hub race means relative to the hub is limited.

9. In a wheel and axle structure, the combination with an axle, of a wheel structure having a hollow hub encircling the axle and carrying a rim having a peripheral flange, two sets of tapered roller bearings between the hub and axle, the outer set of roller bearings being of smaller average diameter of rolling parts than the inner set, axle race means having tracks for the roller bearings, hub race means having separate tracks for the respective sets of roller bearings, the track of the hub race means for the inner set of bearings being arranged in a plane passing through the outer side of the wheel flange and the track of the hub race means for the outer set of roller bearings being located in a plane extending through the wheel structure approximately midway between the outer side of the wheel flange and the outer face of the wheel, the two tracks of the hub race means being fixedly spaced apart axially by means located between said two tracks, abutment means secured to the axle and in abutting relation with an outer end of the axle race means, restraining means at the inner end of the hub, an abutment within the wheel hub directed toward the inner end thereof and in abutting relation with the hub race means, and means for adjustably pressing said restraining means outwardly toward the inner end of the hub race means, whereby the inward movement of said hub race means relative to the hub is limited, said pressing means being releasably and adjustably secured to the wheel structure.

HUGH W. SANFORD.